United States Patent
Hanmann et al.

(10) Patent No.: US 7,275,116 B1
(45) Date of Patent: *Sep. 25, 2007

(54) MOBILE TERMINAL SYNCHRONIZING COMPONENTS OF A DOCUMENT SEPARATELY

(75) Inventors: Jonathan Lee Hanmann, Corona, CA (US); Anil Sareen, Mission Viejo, CA (US); Kenneth J. Smith, Corona, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 807 days.

This patent is subject to a terminal disclaimer.

(21) Appl. No.: 09/918,666

(22) Filed: Jul. 30, 2001

(51) Int. Cl.
*G06F 15/16* (2006.01)

(52) U.S. Cl. ........................ 709/250; 709/248

(58) Field of Classification Search ............... None
See application file for complete search history.

(56) References Cited

U.S. PATENT DOCUMENTS

| | | | |
|---|---|---|---|
| 4,928,177 A * | 5/1990 | Martinez | 725/121 |
| 5,673,259 A * | 9/1997 | Quick, Jr. | 370/342 |
| 5,696,903 A * | 12/1997 | Mahany | 709/228 |
| 5,708,961 A | 1/1998 | Hylton et al. | |
| 5,809,242 A | 9/1998 | Shaw et al. | |
| 5,903,723 A * | 5/1999 | Beck et al. | 709/200 |
| 5,923,648 A * | 7/1999 | Dutta | 370/280 |
| 5,987,480 A | 11/1999 | Donohue et al. | |
| 6,021,426 A | 2/2000 | Douglis et al. | |
| 6,029,045 A | 2/2000 | Picco et al. | |
| 6,085,229 A | 7/2000 | Newman et al. | |
| 6,101,531 A | 8/2000 | Eggleston et al. | |
| 6,138,156 A | 10/2000 | Fletcher et al. | |
| 6,138,158 A | 10/2000 | Boyle et al. | |
| 6,141,010 A | 10/2000 | Hoyle | |
| 6,157,946 A | 12/2000 | Itakura et al. | |
| 6,198,919 B1 * | 3/2001 | Buytaert et al. | 455/426.1 |
| 6,198,920 B1 | 3/2001 | Doviak et al. | |
| 6,216,173 B1 | 4/2001 | Jones et al. | |
| 6,247,135 B1 | 6/2001 | Feague | |
| 6,275,831 B1 | 8/2001 | Bodnar et al. | |
| 6,295,541 B1 | 9/2001 | Bodnar et al. | |
| 6,442,169 B1 | 8/2002 | Lewis | |
| 6,477,543 B1 | 11/2002 | Huang et al. | |
| 6,526,350 B2 | 2/2003 | Sekiyama | |
| 6,549,917 B1 | 4/2003 | Pollard et al. | |
| 6,646,979 B1 * | 11/2003 | Chen et al. | 370/208 |
| 6,647,257 B2 | 11/2003 | Owensby | |

(Continued)

FOREIGN PATENT DOCUMENTS

WO WO 01/35211 A2 5/2001

(Continued)

*Primary Examiner*—John B. Walsh
(74) *Attorney, Agent, or Firm*—Jason T. Evans, Esq.; Howard H. Sheerin, Esq.

(57) ABSTRACT

A method of operating a mobile terminal comprising a local memory and a screen is disclosed. The method comprises the steps of receiving a first component of a document over a first communication channel, receiving a second component of the document over a second communication channel, and combining the first and second components of the document at the mobile terminal. In an alternative embodiment, the first component of the document is received during a first synchronization session, and the second component of the document is received during a second synchronization session.

30 Claims, 9 Drawing Sheets

U.S. PATENT DOCUMENTS

| | | |
|---|---|---|
| 6,647,269 B2 | 11/2003 | Hendrey et al. |
| 6,738,808 B1 | 5/2004 | Zellner et al. |
| 6,826,614 B1 * | 11/2004 | Hanmann et al. ........... 709/227 |
| 6,839,741 B1 * | 1/2005 | Tsai ........................... 709/217 |
| 6,850,740 B1 * | 2/2005 | Haartsen .................... 455/101 |
| 6,892,217 B1 * | 5/2005 | Hanmann et al. ........... 709/200 |
| 6,965,926 B1 * | 11/2005 | Shapiro et al. ............. 709/219 |
| 7,024,491 B1 * | 4/2006 | Hanmann et al. ........... 709/248 |

FOREIGN PATENT DOCUMENTS

| | | |
|---|---|---|
| WO | WO 01/35211 A3 | 5/2001 |

* cited by examiner

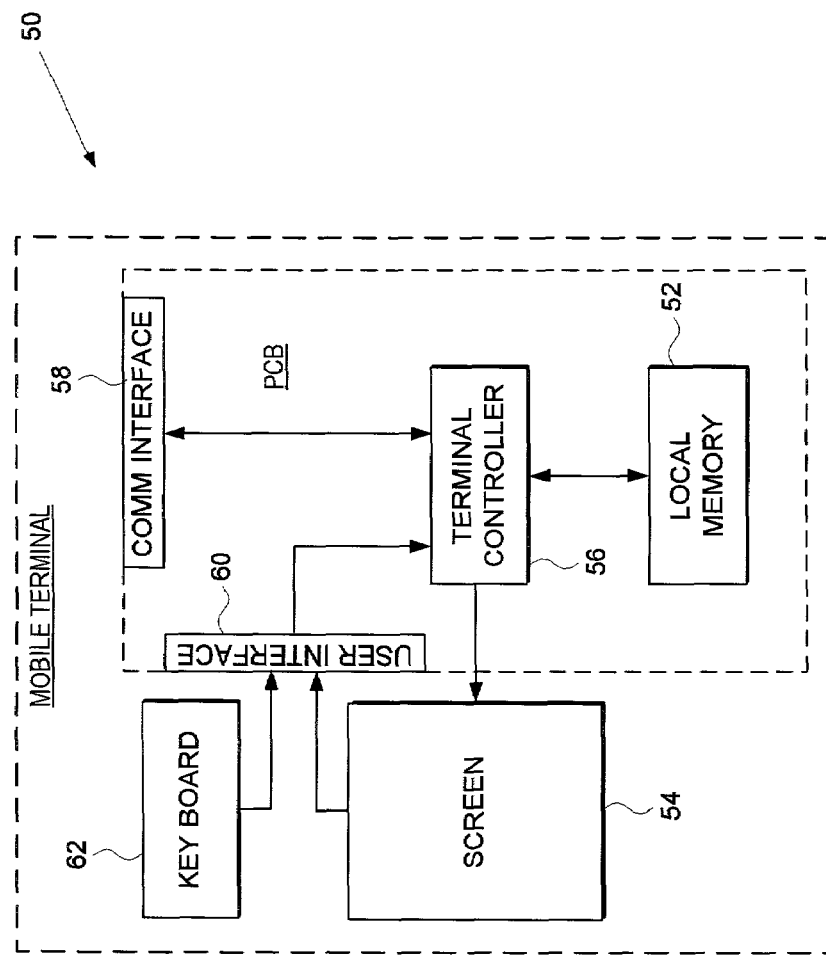

MOBILE TERMINAL SYNCHRONIZING COMPONENTS OF A DOCUMENT SEPARATELY

CROSS REFERENCE TO RELATED APPLICATIONS AND PATENTS

This application is related to co-pending U.S. patent application Ser. No. 09/918,657, entitled "USING MULTIPLE COMMUNICATION CHANNELS TO SYNCHRONIZE A MOBILE TERMINAL BASED ON DATA TYPE", the disclosure of which is herein incorporated by reference.

BACKGROUND OF THE INVENTION

1. Field of the Invention

The present invention relates to mobile terminals. More particularly, the present invention relates to a mobile terminal for synchronizing components of a document separately.

2. Description of the Prior Art

Mobile terminals, such as handheld computers, cellular telephones, tablet computers etc., are typically used to view and manipulate various databases, such as personal information management (PIM) data, emails, and web sites. The mobile terminal is typically synchronized when the databases are updated, for example, when the user modifies PIM data on a target computer or when the contents of a web site change. FIG. 1 illustrates a prior art technique for synchronizing a mobile terminal 2 over a local connection 6 (e.g., a USB connection) to databases stored on a target computer 4 as well as web pages stored on the Internet.

FIG. 2 illustrates various configurations for remotely synchronizing the mobile terminal 2 to the target computer 4 via the Internet 8. The mobile terminal may access the Internet 8 over telephone lines 14 using a modem communicating with an Internet service provider (ISP) 16. Alternatively, the mobile terminal 2 may access the Internet 8 via a wireless connection, such as a cellular provider network (CPN) 18, or a wireless access point (WAP) 20 such as Bluetooth, 802.11b, or HomeRF. In yet another configuration, the mobile terminal 2 may access the Internet 8 through a remote computer 22 connected to the Internet 8. In each of these configurations all of the synchronization data is routed through the target computer 4, creating a bottleneck that can significantly extend the synchronization session. This is undesirable because it increases the access latency to the synchronized data, and for a remote connection (e.g., a wireless connection), it can increase the connection fees and decrease the battery life of the mobile terminal 2.

The prior art has suggested various methods of filtering the synchronization data in order to reduce the amount of data transmitted during a synchronization session. For example, U.S. Pat. No. 6,101,531 suggests to filter emails with respect to their size. In one instance, large attachments are stripped from emails in order to reduce the amount of information transmitted to the mobile terminal. If after receiving the body of the email the user desires to receive the attachment, the user can override the filtering mechanism by requesting that the entire email, including the attachment, be transmitted during the current session. Otherwise, the attachment is deleted from the email server unless the user elects to save the entire email for downloading during a subsequent session. This is undesirable since it requires the user to download the entire email, including the attachment, in one session or forego reading the attachment.

There is, therefore, a need to improve upon the current processes for synchronizing a mobile terminal to synchronization data, such as web sites, emails, and PIM data.

SUMMARY OF THE INVENTION

The present invention may be regarded as a method of operating a mobile terminal comprising a local memory and a screen. The method comprises the steps of receiving a first component of a document over a first communication channel, receiving a second component of the document over a second communication channel, and combining the first and second components of the document at the mobile terminal.

In one embodiment the first communication channel comprises a first bandwidth, and the second communication channel comprises a second bandwidth greater than the first bandwidth.

In another embodiment, the first communication channel has a first connection cost, and the second communication channel has a second connection cost less than the first connection cost.

In one embodiment, the first communication channel comprises a wireless communication channel, and the second communication channel comprises a wired communication channel.

In yet another embodiment, the first communication channel comprises a connection to the Internet, and the second communication channel comprises a connection to a target computer.

In on embodiment, the first component of the document comprises a body of an email, and the second component of the document comprises an attachment to the email.

In another embodiment, the first component of the document comprises a text of a web page, and the second component of the document comprises images of a web page.

In yet another embodiment, the first component of the document comprises a text of a word processing document, and the second component of the document comprises images of the word processing document.

In still another embodiment, the first component of the document is received during a remote synchronization session, and the second component of the document is received during a local synchronization session.

In another embodiment, the first component of the document is received over the first communication channel substantially concurrent with receiving the second component of the document over the second communication channel.

The present invention may also be regarded as a method of operating a mobile terminal comprising the steps of receiving a first component of a document over a communication channel during a first synchronization session, receiving a second component of the document over the communication channel during a second synchronization session, and combining the first and second components of the document at the mobile terminal.

The present invention may also be regarded as a mobile terminal comprising a screen, a local memory, and a terminal controller. The terminal controller for receiving a first component of a document over a first communication channel, receiving a second component of the document over a second communication channel, and combining the first and second components of the document at the mobile terminal.

The present invention may also be regarded as a mobile terminal comprising a screen, a local memory, and a terminal controller. The terminal controller for receiving a first component of a document over a communication channel during a first synchronization session, receiving a second component of the document over the communication channel during a second synchronization session, and combining the first and second components of the document at the mobile terminal.

The present invention may also be regarded as a computer program embodied on a computer readable storage medium for use in a mobile terminal. The computer program comprises code segments for receiving a first component of a document over a first communication channel, receiving a second component of the document over a second communication channel, and combining the first and second components of the document at the mobile terminal.

The present invention may also be regarded as a computer program embodied on a computer readable storage medium for use in a mobile terminal. The computer program comprising code segments for receiving a first component of a document over a communication channel during a first synchronization session, receiving a second component of the document over the communication channel during a second synchronization session, and combining the first and second components of the document at the mobile terminal.

BRIEF DESCRIPTION OF THE DRAWINGS

FIG. 5A shows a mobile terminal according to an embodiment of the present invention comprising a terminal controller for receiving components of a document over respective communication channels.

DESCRIPTION OF THE PREFERRED EMBODIMENTS

Figure 4A:
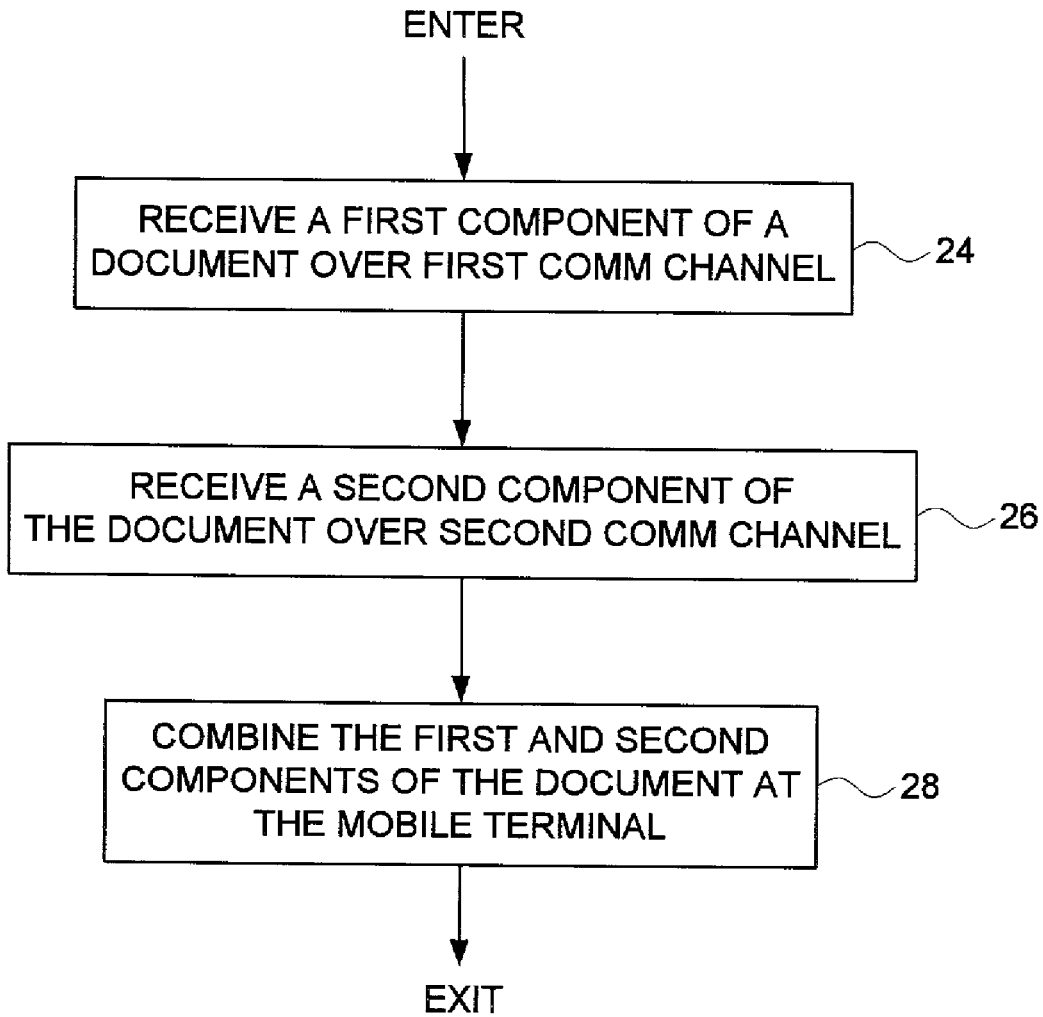
FIG. 4A is a flow chart illustrating an embodiment of the present invention wherein the components of the document are received over respective communication channels.

FIG. 4A is a flow chart illustrating a method of the present invention for operating a mobile terminal comprising a local memory and a screen. At step 24 a first component of a document is received over a first communication channel, and at step 26 a second component of the document is received over a second communication channel. At step 28 the first and second components of the document are combined at the mobile terminal.

Figure 4B:
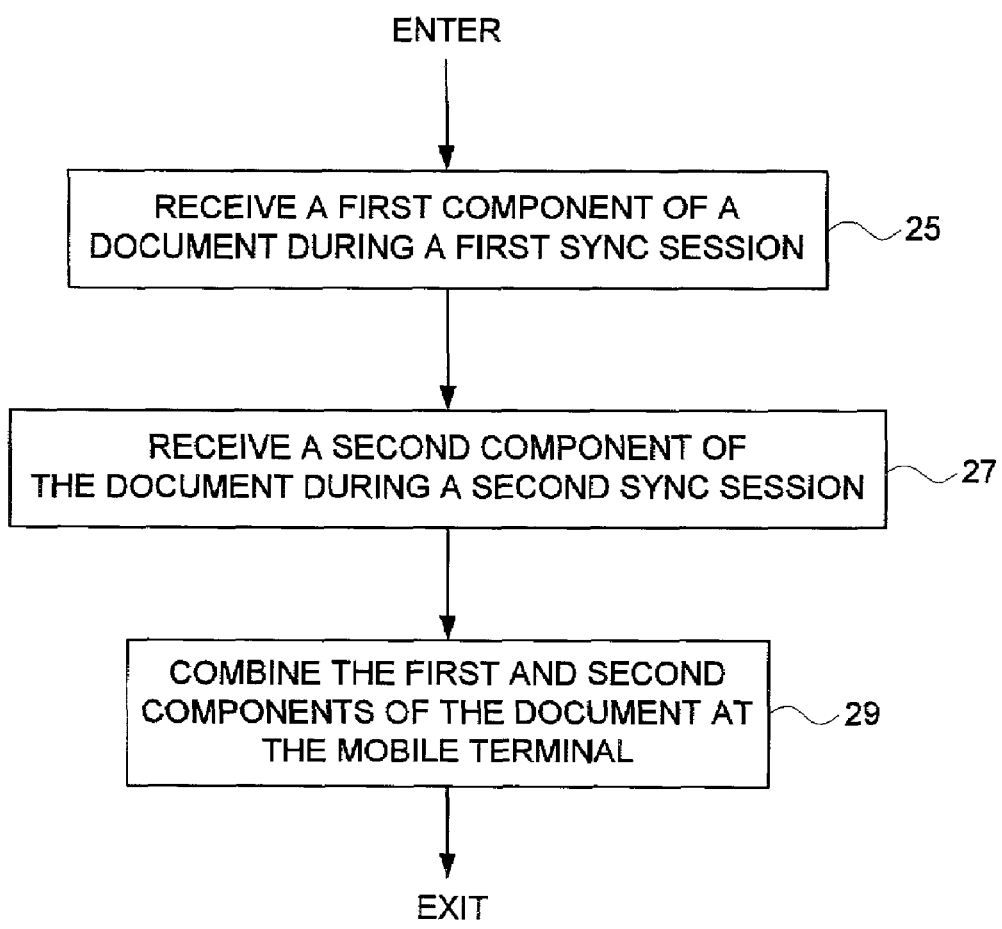
FIG. 4B is a flow chart illustrating an alternative embodiment of the present invention wherein the components of the document are received during respective synchronization sessions.

FIG. 4B is a flow chart illustrating a method of the present invention for operating a mobile terminal comprising a local memory and a screen. At step 25 a first component of a document is received during a first synchronization session, and at step 27 a second component of the document is received during a second synchronization session. At step 29 the first and second components of the document are combined at the mobile terminal.

Figure 1:
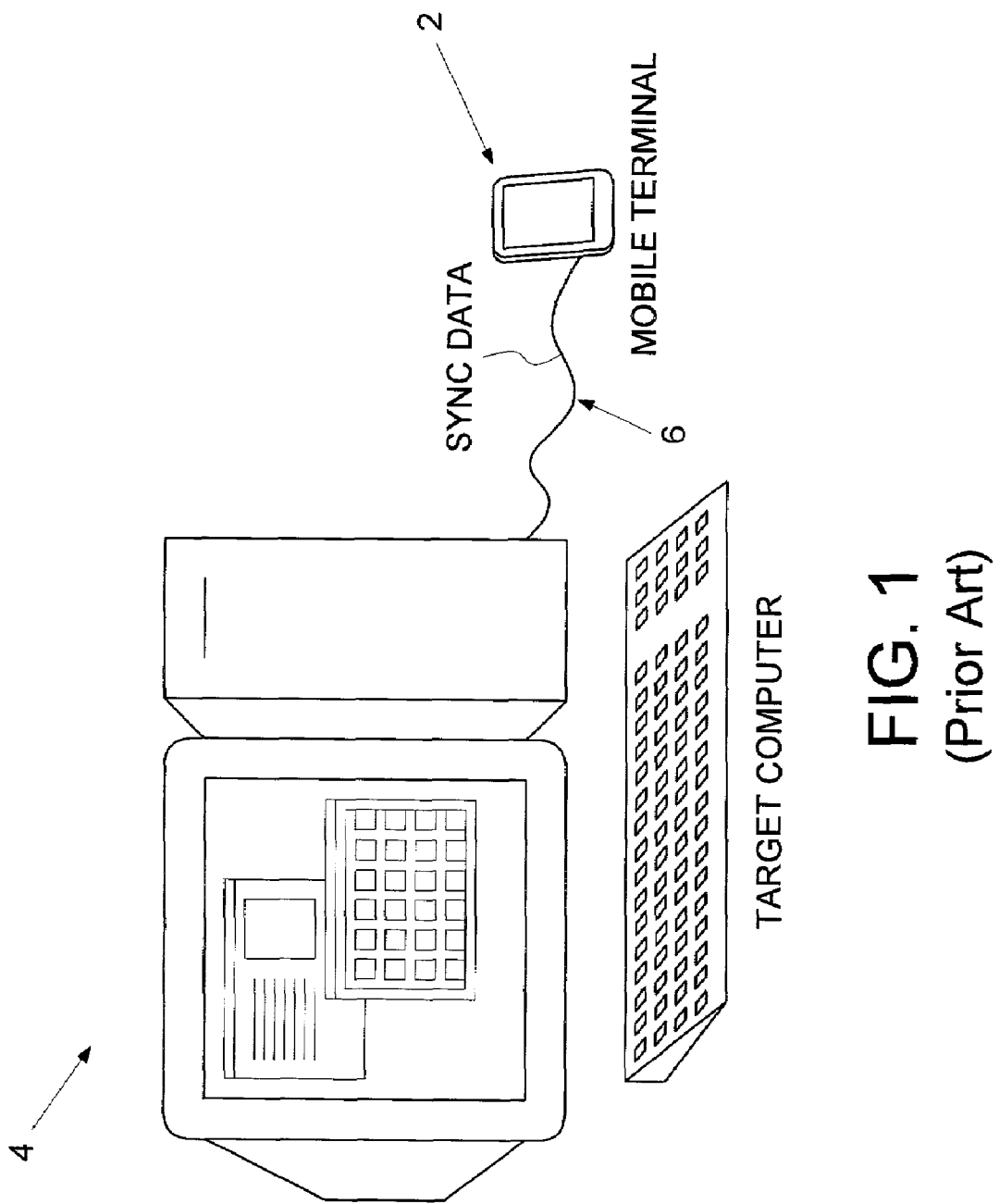
FIG. 1 shows a prior art configuration wherein a mobile terminal is synchronized to a target computer over a direct wired connection.
Figure 2:
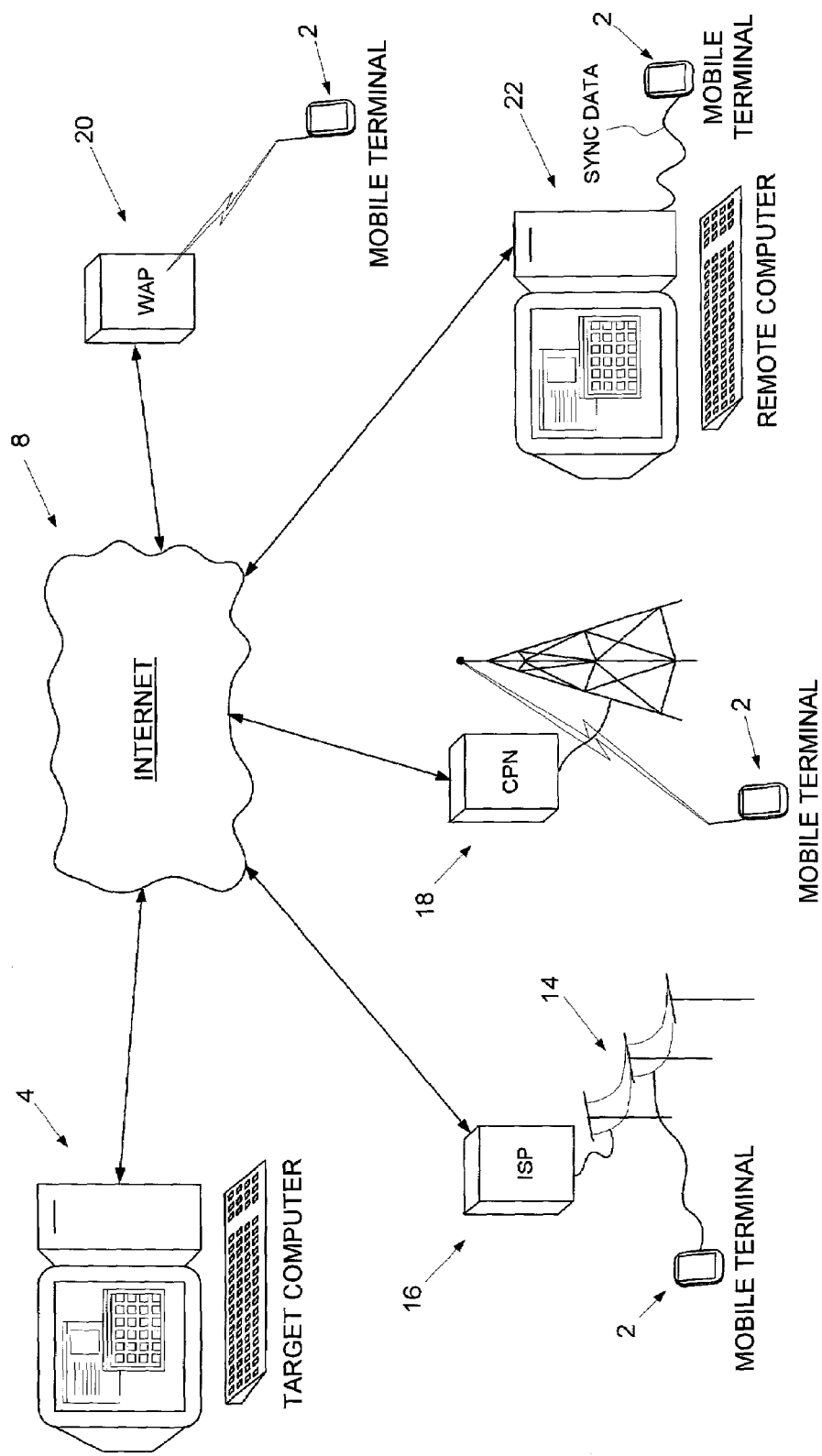
FIG. 2 shows a prior art configuration wherein a mobile terminal is synchronized remotely to the target computer over a wired connection (e.g., telephone land lines) or over a wireless network via the Internet.
Figure 3A:
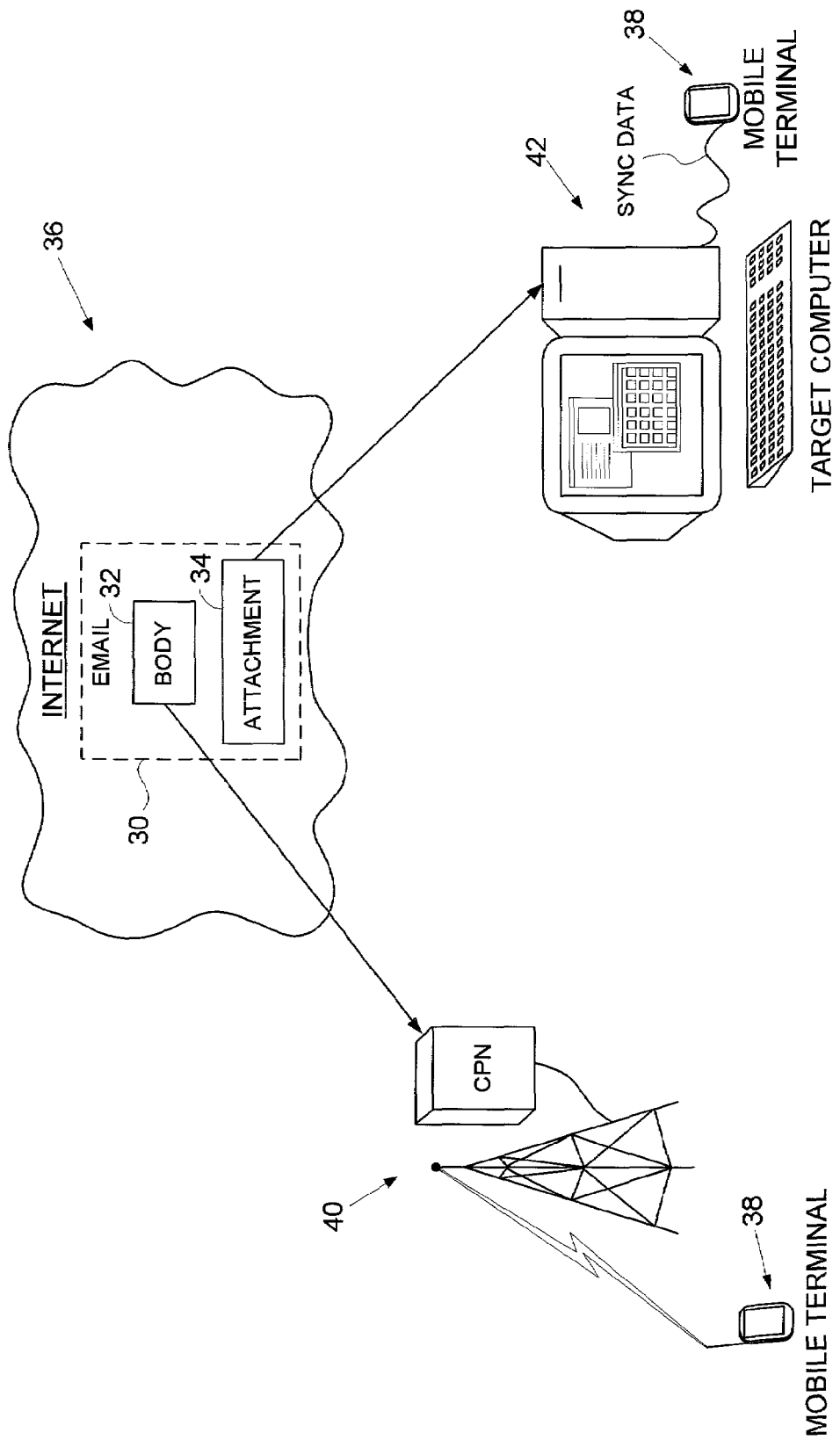
FIG. 3A illustrates an embodiment of the present invention wherein a first component of a document is transmitted to the mobile terminal over a first communication channel, and a second component of a document is transmitted to the mobile terminal over a second communication channel.

In one embodiment the first communication channel comprises a first bandwidth, and the second communication channel comprises a second bandwidth greater than the first bandwidth. This embodiment is illustrated in FIG. 3A wherein the document is an email 30 comprising a body 32 and an attachment 34 stored on the Internet 36. A mobile terminal 38 communicates with the Internet 36 to receive the components of the email 30. The mobile terminal 38 receives the body 32 during a remote synchronization session over a wireless communication channel 40 having a first bandwidth, and receives the attachment 34 during a local synchronization session over a wired communication channel 42 having a second bandwidth greater than the first bandwidth.

In one embodiment, the first communication channel has a first connection cost, and the second communication channel has a second connection cost less than the first connection cost. Referring again to FIG. 3A, a time-based connection fee is typically charged by the wireless communication channel 40 whereas the wired communication channel 42 typically charges a monthly fee for unlimited connection time. The wireless connection fee can quickly surpasses the wired monthly fee, so it is desirable to minimize the amount of data transmitted to the mobile terminal 38 over the wireless communication channel 40. The body of an email typically comprises text only and is therefore typically much smaller than an attachment which typically comprises an image, word processing document, or other large file. In the embodiment of FIG. 3A, only the body 32 of the email 30 is transmitted over the wireless communication channel 40 during a remote synchronization session in order to minimize the time and expense. During a subsequent local synchronization session, the attachment 34 of the email 30 is transmitted over the higher-bandwidth, lower-cost wired communication channel 42. The body 32 and attachment 34 are then combined at the mobile terminal 38. This allows the user of the mobile terminal 38 to view the body of emails after synchronizing remotely while avoiding the time and expense associated with receiving the attachments. The attachments are then transmitted to the mobile terminal during the local synchronization session without having to retransmit the body of the emails.

In one embodiment, the mobile terminal 38 evaluates the components of various documents stored in the local memory to determine which components to request during the local synchronization session. For example, in one embodiment the mobile terminal 38 evaluates the emails currently stored in the local memory, including those emails which have missing attachments. During the local synchronization session the mobile terminal 38 transmits a request to receive only the missing attachment for a selected email rather than sending a request to receive the entire email.

In the embodiment of FIG. 3A, the wireless communication channel 40 provides a direct connection between the mobile terminal 38 and the Internet 36, whereas the wired communication channel 42 provides an indirect connection between the Internet 36 through a target computer. The mobile terminal 38 communicates with the target computer through any suitable connection, such as a USB, serial, or infrared connection.

Any document may be decomposed into a plurality of components and transmitted over respective communication channels. In one embodiment, the first component of the document comprises a text of a web page, and the second component of the document comprises images of a web page. In another embodiment, the first component of the document comprises a text of a word processing document, and the second component of the document comprises images of the word processing document.

Figure 3B:
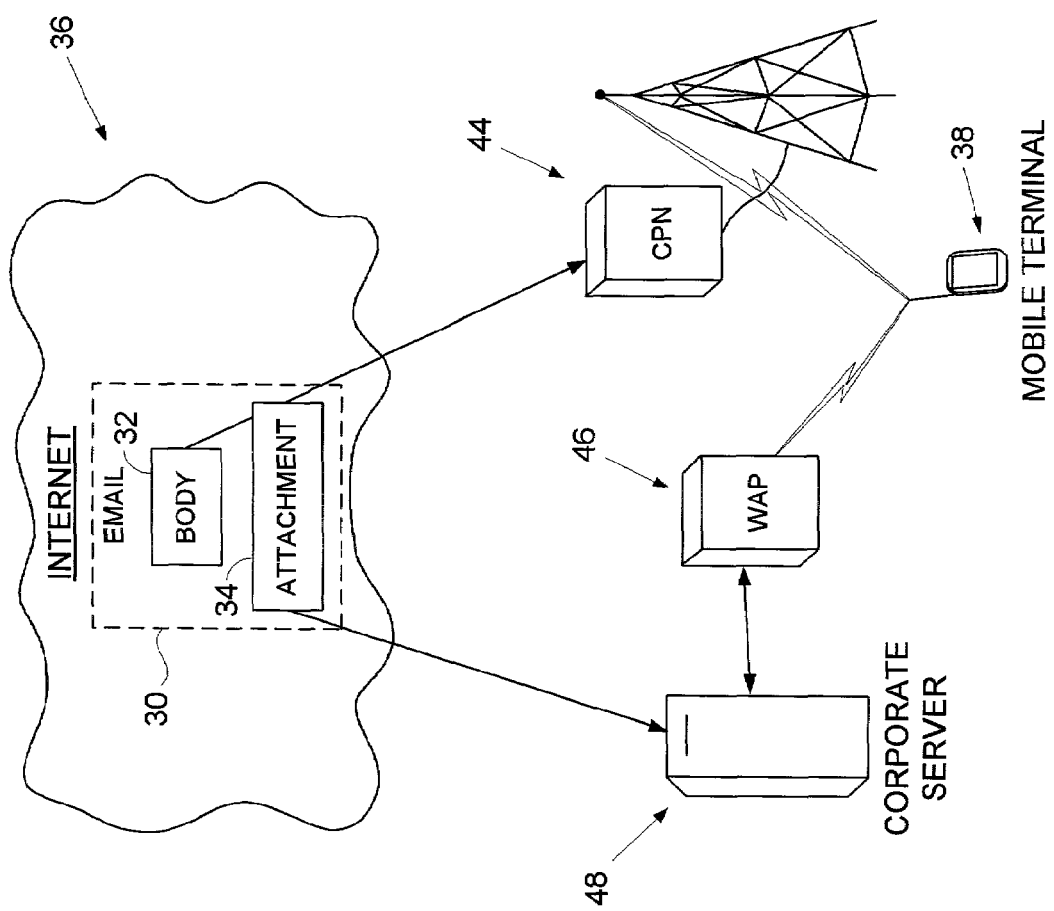
FIG. 3B illustrates an embodiment of the present invention wherein the components of a document are transmitted over respective communication channels to the mobile terminal in a substantially concurrent manner.

In yet another embodiment, the first component of the document is received over the first communication channel substantially concurrent with receiving the second component of the document over the second communication channel. This embodiment is illustrated in FIG. 3B which shows a mobile device 38 receiving a body 32 of an email 30 over a CPN 44 and receiving substantially concurrently an attachment 34 of the email 30 over a WAP 46 and corporate server 48. This embodiment may expedite the synchronization session and conserve battery power by exploiting multiple communication channels available concurrently to the mobile terminal 38. Further details of this embodiment are disclosed in the above referenced co-pending patent application entitled "USING MULTIPLE COMMUNICATION CHANNELS TO SYNCHRONIZE A MOBILE TERMINAL BASED ON DATA TYPE".

Figure 3C:
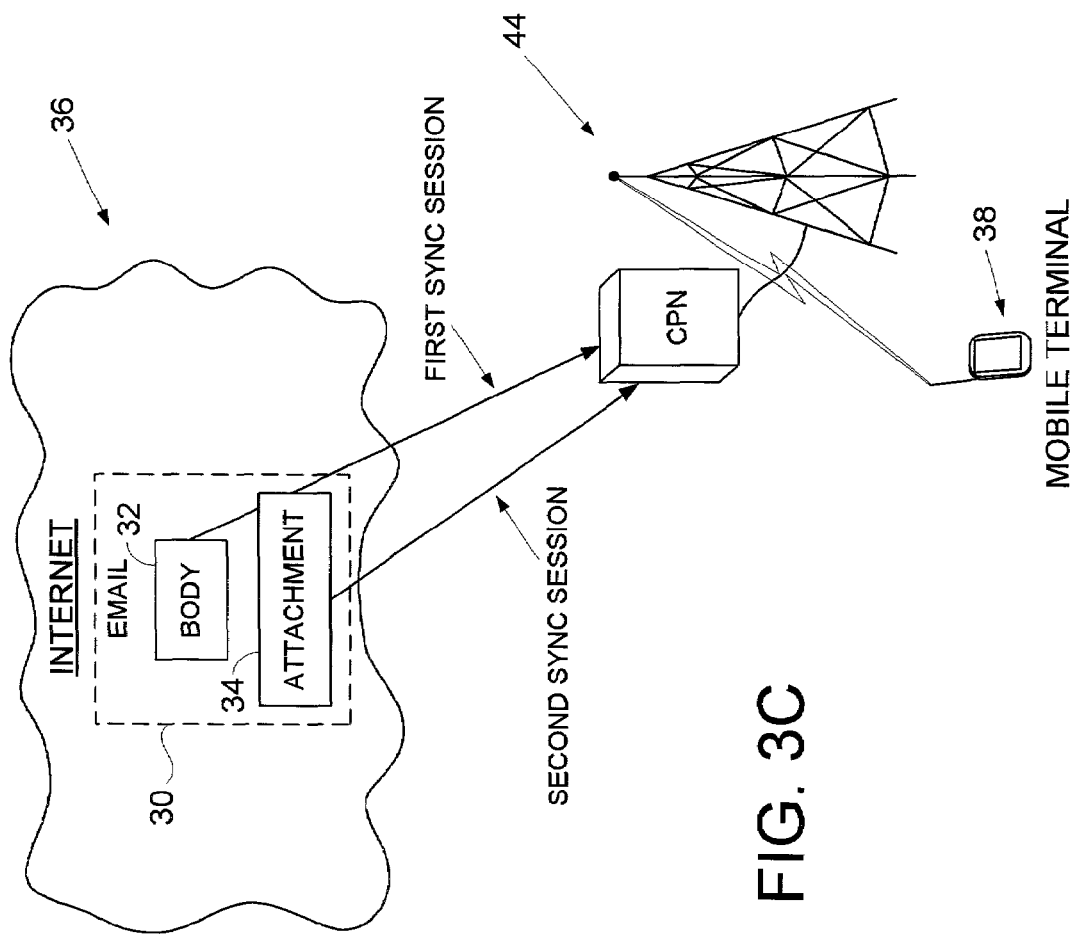
FIG. 3C illustrates an embodiment of the present invention wherein the first component of the document is received during a first synchronization session, and the second component of the document is received during a second synchronization session.

FIG. 3C illustrates an embodiment of the present invention wherein the first component of the document is received during a first synchronization session, and the second component of the document is received during a second synchronization session. In the embodiment of FIG. 3C, the mobile terminal 38 receives the body 32 of an email 30 over a CPN 44 during a first synchronization session, and receives an attachment 34 of the email 30 over the CPN 44 during a second synchronization session. This embodiment may help minimize the expense when synchronizing over a communication channel that has a variable fee structure. For example, the CPN 44 may charge a higher connection fee during peak traffic hours (e.g., during the day) and charge a lower connection fee during low traffic hours (e.g., at night). During peak traffic hours the mobile terminal 38 selectively synchronizes smaller document components, such as email bodies, and defers synchronizing larger document components, such as email attachments, until the low traffic hours. This allows the user to access a select subset of the synchronization data during the peak traffic hours without incurring the cost of transmitting all of the synchronization data during the peak traffic hours.

FIG. 5A shows a mobile terminal 50 for receiving components of a document over respective communication channels according to an embodiment of the present invention. The mobile terminal 50 comprises a local memory 52 for storing the components of a document, a screen 54, and a terminal controller 56. The terminal controller 56 for receiving a first component of the document over a first communication channel, and for receiving a second component of the document over a second communication channel. In an alternative embodiment, the terminal controller 56 receives the first component of the document during a first synchronization session, and receives the second component of the document during a second synchronization session. The terminal controller 56 then combines the components of the document to reproduce the document at the mobile terminal 50. In the embodiment of FIG. 5A, the mobile terminal 50 further comprises a communication interface 58 for receiving the components of the document, and a user interface 60 for receiving user input from a key board 62 as well as the screen 54.

Figure 5B:
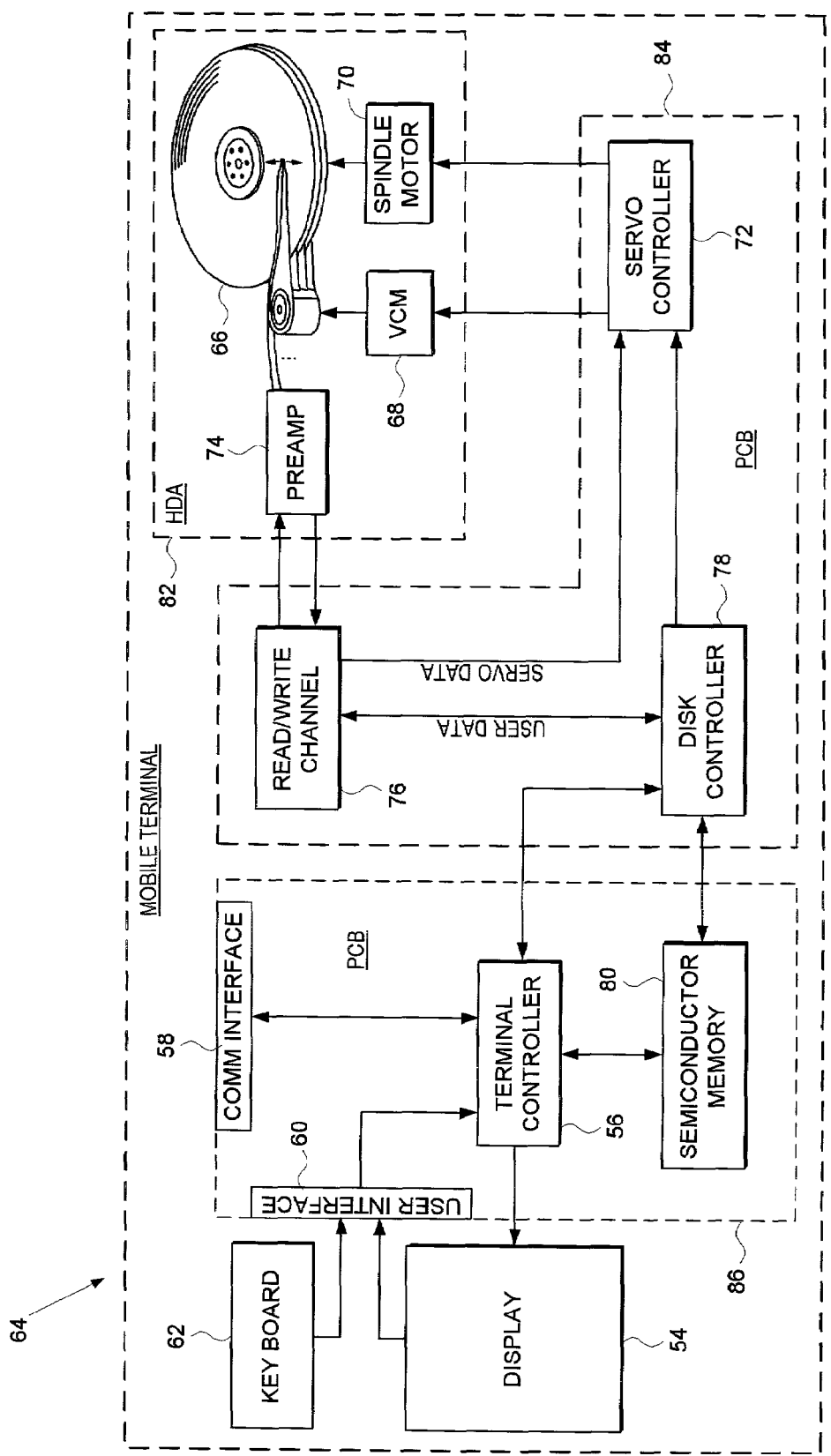
FIG. 5B shows a mobile terminal according to an embodiment of the present invention comprising a disk for non-volatile storage of the document components.

FIG. 5B shows a mobile terminal 64 according to an embodiment of the present invention wherein the local memory comprises a disk 66. The mobile terminal 64 further comprises components for enabling the disk storage, including a voice coil motor (VCM) 68 and spindle motor 70, a servo controller 72, a preamp 74, a read/write channel 76, and a disk controller 78. In the embodiment of FIG. 5B, the mobile terminal 64 comprises semiconductor memory 80 that is shared by the terminal controller 56 and disk controller 78 to reduce the cost of the mobile terminal 64. In another embodiment, the terminal controller 56 executes a disk caching algorithm for caching data read from and written to the disk 66. In the embodiment of FIG. 5B, the disk 66, VCM 68, spindle motor 70 and preamp 74 are implemented within a head disk assembly (HDA) 82, the servo controller 72, read/write channel 76 and disk controller 78 are implemented on a first printed circuit board (PCB) 84, and the terminal controller 56 and semiconductor memory 80 are implemented on a second PCB 86. In an alternative embodiment, the servo controller 72, read/write channel 76, disk controller 78, terminal controller 56, and semiconductor memory 80 are implemented on a single PCB.

In one embodiment, the local memory of the mobile terminal (e.g., the disk 66 in FIG. 5B) stores a computer program comprising a code segment for receiving a first component of a document over a first communication channel, and for receiving a second component of the document over a second communication channel. In an alternative embodiment, the computer program comprises a code segment for receiving the first component of the document during a first synchronization session, and for receiving the second component of the document during a second synchronization session. The computer program further comprises a code segment for combining the components of the document to reproduce the document at the mobile terminal.

We claim:

1. A method of operating a mobile terminal having first and second distinct communication interfaces, the method comprising the steps of:
   (a) receiving a first component of a document over a first communication channel via the first communication interface;
   (b) receiving a second component of the document over a second communication channel via the second communication interface;
   (c) displaying the first component of the document before completion of the receipt of the second component of the document; and
   (d) combining the first and second components of the document at the mobile terminal.

2. The method as recited in claim 1, wherein:
   (a) the first communication channel comprises a first bandwidth; and
   (b) the second communication channel comprises a second bandwidth greater than the first bandwidth.

3. The method as recited in claim 1, wherein:
   (a) the first communication channel having a first connection cost; and (b) the second communication channel having a second connection cost less than the first connection cost.

4. The method as recited In claim 1, wherein:
(a) the first communication channel comprises a wireless communication channel; and
(b) the second communication channel comprises a wired communication channel.

5. The method as recited in claim 1, wherein:
(a) the first communication channel comprises a connection to the Internet; and
(b) the second communication channel comprises a connection to a target computer.

6. The method as recited in claim 1, wherein:
(a) the first component of the document comprises a body of an email; and
(b) the second component of the document comprises an attachment to the email.

7. The method as recited in claim 1, wherein:
(a) the first component of the document comprises a text of a web page; and
(b) the second component of the document comprises images of a web page.

8. The method as recited in claim 1, wherein:
(a) the first component of the document comprises a text of a word processing document; and
(b) the second component of the document comprises images of the word processing document.

9. The method as recited in claim 1, wherein:
(a) the first component of the document is received during a remote synchronization session; and
(b) the second component of the document is received during a local synchronization session.

10. The method as recited in claim 1, wherein:
(a) the first component of the document is received during a first synchronization session; and
(b) the second component of the document is received during a second synchronization session.

11. A mobile terminal comprising:
(a) a screen;
(b) a local memory;
(c) first and second distinct communication interfaces; and
(d) a terminal controller for:
receiving a first component of a document over a first communication channel via the first communication interface;
receiving a second component of the document over a second communication channel via the second communication interface;
displaying the first component of the document before completion of the receipt of the second component of the document; and
combining the first and second components of the document at the mobile terminal.

12. The mobile terminal as recited in claim 11, wherein:
(a) the first communication channel comprises a first bandwidth; and
(b) the second communication channel comprises a second bandwidth greater than the first bandwidth.

13. The mobile terminal as recited In claim 11, wherein:
(a) the first communication channel having a first connection cost; and
(b) the second communication channel having a second connection cost less than the first connection cost.

14. The mobile terminal as recited in claim 11, wherein:
(a) the first communication channel comprises a wireless communication channel; and
(b) the second communication channel comprises a wired communication channel.

15. The mobile terminal as recited in claim 11, wherein:
(a) the first communication channel comprises a connection to the Internet; and
(b) the second communication channel comprises a connection to a target computer.

16. The mobile terminal as recited in claim 11, wherein:
(a) the first component of the document comprises a body of an email; and
(b) the second component of the document comprises an attachment to the email.

17. The mobile terminal as recited in claim 11, wherein:
(a) the first component of the document comprises a text of a web page; and
(b) the second component of the document comprises images of a web page.

18. The mobile terminal as recited in claim 11, wherein:
(a) the first component of the document comprises a text of a word processing document; and
(b) the second component of the document comprises images of the word processing document.

19. The mobile terminal as recited in claim 11, wherein:
(a) the first component of the document is received during a remote synchronization session; and
(b) the second component of the document is received during a local synchronization session.

20. The mobile terminal as recited in claim 11, wherein:
(a) the first component of the document is received during a first synchronization session; and
(b) the second component of the document is received during a second synchronization session.

21. A computer program embodied on a computer readable storage medium executed in a mobile terminal having first and second distinct communication interfaces, the computer program comprising code segments for:
(a) receiving a first component of a document over a first communication channel via the first communication interface;
(b) receiving a second component of the document over a second communication channel via the second communication interface;
(c) displaying the first component of the document before completion of the receipt of the second component of the document; and
(d) combining the first and second components of the document at the mobile terminal.

22. The computer program as recited in claim 21, wherein:
(a) the first communication channel comprises a first bandwidth; and
(b) the second communication channel comprises a second bandwidth greater than the first bandwidth.

23. The computer program as recited in claim 21, wherein:
(a) the first communication channel having a first connection cost; and
(b) the second communication channel having a second connection cost less than the first connection cost.

24. The computer program as recited in claim 21, wherein:
(a) the first communication channel comprises a wireless communication channel; and
(b) the second communication channel comprises a wired communication channel.

25. The computer program as recited in claim 21, wherein:

(a) the first communication channel comprises a connection to the Internet; and
(b) the second communication channel comprises a connection to a target computer.

26. The computer program as recited in claim 21, wherein:
(a) the first component of the document comprises a body of an email; and
(b) the second component of the document comprises an attachment to the email.

27. The computer program as recited in claim 21, wherein:
(a) the first component of the document comprises a text of a web page; and
(b) the second component of the document comprises images of a web page.

28. The computer program as recited in claim 21, wherein:

(a) the first component of the document comprises a text of a word processing document; and
(b) the second component of the document comprises images of the word processing document.

29. The computer program as recited in claim 21, wherein:
(a) the first component of the document is received during a remote synchronization session; and
(b) the second component of the document is received during a local synchronization session.

30. The computer program as recited in claim 21, wherein:
(a) the first component of the document is received during a first synchronization session; and
(b) the second component of the document is received during a second synchronization session.

* * * * *